United States Patent [19]
Richards

[11] Patent Number: 4,819,092
[45] Date of Patent: Apr. 4, 1989

[54] APPARATUS FOR WRITING SIGNAL DENSITY INFORMATION ON A MAGNETIC MEDIUM

[75] Inventor: Alan J. Richards, Loveland, Colo.

[73] Assignee: Colorado Memory Systems, Inc., Loveland, Colo.

[21] Appl. No.: 48,017

[22] Filed: May 8, 1987

[51] Int. Cl.[4] ............................. G11B 5/02; G11B 5/03
[52] U.S. Cl. ........................................... 360/27; 360/66
[58] Field of Search ................. 360/118, 66, 77, 78, 360/27, 28

[56] References Cited

U.S. PATENT DOCUMENTS

| | | | |
|---|---|---|---|
| 3,769,469 | 10/1973 | Garnier et al. ....................... | 360/118 |
| 3,932,894 | 1/1976 | Arter et al. .......................... | 360/134 |
| 4,054,947 | 10/1977 | Shanks et al. ....................... | 364/900 |
| 4,298,897 | 11/1981 | Arter et al. ............................ | 360/39 |
| 4,644,421 | 2/1987 | Miwa et al. .......................... | 360/66 |

*Primary Examiner*—Vincent P. Canney
*Attorney, Agent, or Firm*—Dorr, Carson, Sloan & Peterson

[57] ABSTRACT

Apparatus is disclosed for using a head having narrow write gap to write tracks of information on a tape for subsequent reading by other apparatus including apparatus having heads with a wide read gap. An inter track erase operation is performed prior to the writing operation. Density information is written on a plurality of tracks to indicate the flux reversal signal density used for the writing of user data elsewhere on the tape.

31 Claims, 8 Drawing Sheets

APPARATUS FOR WRITING SIGNAL DENSITY INFORMATION ON A MAGNETIC MEDIUM

FIELD OF THE INVENTION

This invention relates to apparatus for exchanging data and information signals with a record member such as a magnetic medium. In particular, this invention relates to apparatus for recording density information on and reading density information from a magnetic tape.

BACKGROUND OF INVENTION

The advancement of technology in the field of digital signal recording has resulted in a continuing increase in areal recording density. In the field of magnetic recorders, a transition is not immediately made by all users from the old to the new as improved equipment capable of accommodating higher densities is made available. Users of older equipment may often choose to defer new acquisitions and use their existing equipment for the duration of its useful life. The transition from the old to new is therefore gradual and at any given instant of time, there is a spectrum of digital tape recorders of varying ages in the marketplace. The situation is dynamic in that new machines of increased capability are periodically introduced so that a new machine representing the present state of the art is destined to be replaced ultimately by improved machines at some future time.

It is desirable that newer machines have the capability of backward compatibility. Backward compatibility refers to the ability of a newer machine capable of reading and writing with higher signal densities to be able to read and/or write tapes produced on earlier machines of lower recording densities. It is often the case that tapes or the like (hereinafter tapes) recorded by a first machine are subsequently read by another machine. If the first machine has only a low density capability and the second machine has higher density capabilities, or vice versa, it is necessary that the tape be compatible to both machines so that the second machine can read the tapes generated by the first machine.

It is also desirable that the newer machines be flexible in their operation and have the capability of recording at different bit densities. This provides maximum compatibility and permits the use and exchange of tapes among the various recorders owned by a single user or family of users who desire to exchange tapes.

It is necessary that tape recorders capable of operating at a plurality of different flux densities know the density of the user information recorded on each tape that is to be read. It is known to record density information on a magnetic tape specifying the density at which user information is recorded on the tape. U.S. Pat. No. 4,054,947 discloses a computer-tape transport interface which can both record information on a tape indicating the recording density used to record user data, as well as reading density information from a priorly recorded tape. In accordance with the teachings of this U.S. patent, density information is recorded on the beginning portion of the tape in the form of a series of binary ones and zeroes. A burst of binary ones and zeroes specifies a first recording density. The absence of such a burst represents a different density.

U.S. Pat. No. 3,932,894 discloses a rotating head magnetic recorder adapted to be used with an open reel magnetic tape having a designated area reserved on the lead end of the tape for recording density information. This Patent does not teach the specifics of how density information is to be recorded. It merely teaches that an appropriate density code can be recorded on a tape specifying the bit density of the user data recorded elsewhere on the tape. Since the patent is directed to rotating head magnetic recording apparatus in which information is recorded in a plurality of angularly positioned tracks intermediate the sides of the tape, the density information is presumably recorded in similar angularly oriented tracks.

U.S. Pat. No. 4,298,897 discloses an improvement of U.S. Pat. No. 3,932,894 and, in particular, discloses a rotating head magnetic recorder having the capability of reading and writing tapes with different flux densities. This Patent discloses apparatus having a wide recording head and two separate relatively narrow reading heads. Data is recorded at lower densities by using the entire width of a portion of the tape termed a "stripe." The recording head is moved one stripe at a time, from stripe to stripe, to record successive stripes of low density information.

Only a half of a stripe is used for the recording of high density information. In this case, the recording head, is only moved a distance of one-half stripe at a time as successive half stripes are recorded. The apparatus of this patent always uses a recording head that is one stripe wide. The first stripe is recorded by using the entire width of the stripe. Next, the recording head is moved a distance of one-half a stripe and the recording process continues. This recording process for the second stripe overwrites one-half of the first stripe that was recorded. The process continues in this manner with high density information being recorded for the full width of a stripe but with one-half of a stripe being overwritten as the next stripe is recorded.

On playback, high density information is read using two read heads concurrently with the entire width of the stripe being read at a time and with each of the two read heads reading its assigned one-half of a stripe. Only a single read head is used for reading one stripe wide low density information. However, the second read head is available as a backup in case of a failure of the first read head. The recording apparatus of this U.S. Pat. No. 4,298,897 records density information in one end of each stripe. The density information (62 and 63) in a stripe comprises a two bit code. This patent also records a table of contents at the beginning of the tape (CTOC). The table of contents is recorded at low density and specifies the density used on the rest of the tape.

While the teachings of the above-identified U.S. Patents represent an advance in the art in that they provide arrangements for recording density information on a magnetic tape or the like, they each suffer from one or more disadvantages. They each use a single track to record the tape density information. U.S. Pat. No. 4,054,947 uses a single burst of information in a single track to indicate one possible tape density and uses the absence of this information to represent another density. This arrangement is disadvantageous because of inherent problems of reliability. First of all, the absence of density information could be due to a failure of the recording mechanism of the device that originally recorded the tape. The absence of a signal could also be caused by a blank or an alien tape. The presence of the ID burst is a positive indication, absence is not. Secondly, the presence of the information need not necessarily represent valid density information. Instead, it could possibly represent user data on a tape that does not contain any density information whatsoever. Also, only one binary condition is encoded by this patent—the presence of high density information.

U.S. Pat. Nos. 3,932,894 and 4,298,897 record the density information in the form of sequential binary digits on a single track or stripe of the tape. This arrangement is subject to problems of reliability in that false information due to noise and the like could mimic valid tape density information. Also, the tape density codes could be mimicked by user data on tapes that do not contain any density information whatsoever. An example of such tapes could be those recorded by an alien tape drive that does not follow these teachings. Also, schemes which require reading and writing of specific bit patterns are more difficult to implement. For example, if the ID is recorded at one density, a later machine designed for higher density would need to be able to encode, write, read, and decode ID data at this lower density. The facilities of U.S. Pat. No. 4,298,897 are also less than ideal in that they do not permit a single track of data to be overwritten in high density mode while leaving the remaining tracks unaltered. The reason for this is that the wide recording head of this Patent spans two half stripes and therefore the recording of a single high density track in a half stripe of the tape would overwrite valid data in the adjacent one-half stripe tape segment. It may therefore be seen that the currently available facilities for writing tape density information on a magnetic record such as a tape are less than ideal.

SUMMARY OF THE INVENTION

The present invention overcomes the above discussed disadvantages and achieves an advance in the art by providing apparatus that writes density information specifying any one of a plurality of densities on a magnetic medium, such as a tape, in an improved manner whereby the information cannot be accidentally mimicked by user data, alien recordings and the like. A further advantage of the invention is that it enables a single track of information to be overwritten without destroying or altering the information in adjacent tracks. This advantage is achieved since the write head can be narrower on higher density machines rather than the same width as those on low density machines.

Signal density information is recorded on the lead portion of a tape in a format that uses a plurality of tracks rather than a single track. The density information recorded in each track does not by itself indicate the density of data recorded elsewhere on the tape. Instead, the information in each track is a subset or one digit of a density identification (ID) code. For example, if five tracks are used to record the density ID in binary coded form, the information in each track is merely a binary 1 or 0 and represents only one bit of the five bit binary code. The combined information in the five tracks represents the density code. Any number of densities are possible by adding more tracks if required. The signal recorded in each track may vary depending upon the specific application. In a first preferred embodiment, the value of the binary digit to be represented by a track may be indicated by recording a signal in the track at a specified flux reversal density to represent a binary 1 and by erasing the track to represent a binary 0. Alternatively, a binary 1 could be represented by recording a signal at a first bit density and a binary 0 could be represented by recording a signal at a different bit density. Still other alternative arrangements are available and are subsequently discussed.

The invention provides apparatus which detects the beginning of tape (BOT) and the load point (LP) portions of the tape. As is typical in the art, the LP tape portion is a hole on the tape that indicates that the user data tape portion is about to be encountered. The invention provides apparatus which detects the LP portion and then for a measured distance such as, for example, 4.1 inches, records density ID signals in each of a plurality of tracks on the tape. In this system, this region is not used for user data.

The process of the invention begins with an erase operation in which the inter track areas of the tape are erased. Following this erase operation, the tape density ID code is recorded in a plurality of tracks (five tracks) in a binary code in the portion of the tape immediately following the LP hole. The bit density that is used to record the density ID code is unique so as to distinguish it from any possible bit density that is currently or likely to be used in the future to record user data. This provides a measure of safety so as to prevent the circuitry that detects the density ID code from falsely responding to signals on tapes that may be inadvertently written with user data near the LP hole. This includes tapes recorded by alien systems.

The present invention provides advantages and features that solve the above discussed problems of the prior art. First of all, the use of an initial erase operation in the inter track areas of the tape enhances compatibility among the spectrum of machines of different vintages that may be encountered. Specifically, the use of the erase operation permits newer machines having narrower recording head gaps to write data on tapes for subsequent use by older machines having wider read head gaps. Since the inter track areas adjacent to each side of a narrowly recorded track have been erased, the use of the wider read head gaps of the older machines may be accommodated without these wider head gaps encountering noise or spurious signals that might otherwise be the case if the inter track erase operation was not performed.

Secondly, the use of a plurality of tracks to represent a tape density ID code in a binary coded manner provides increased reliability against the possibility of a blank tape or user data or alien recordings from mimicking the density information. The use of the plurality of tracks in recording the density ID code in binary coded manner makes it extremely unlikely that user data or noise in this portion of the tape could appear to the read circuitry as a valid density ID code. To further prevent the possibility of this occurrence, a signal of a unique bit density is recorded in each track with this unique bit density being different from any bit density that is likely to be used to record user data. In summary, it may be seen that the present invention provides improved facilities for recording bit density information on a tape in a manner that overcomes the deficiencies and problems above discussed for the prior art arrangements.

BRIEF DESCRIPTION OF THE DRAWING

These and other advantages and features of the present invention may be more readily understood from a reading of the following description thereof taken in conjunction with the drawing in which.

DETAILED DESCRIPTION

Figure 1:
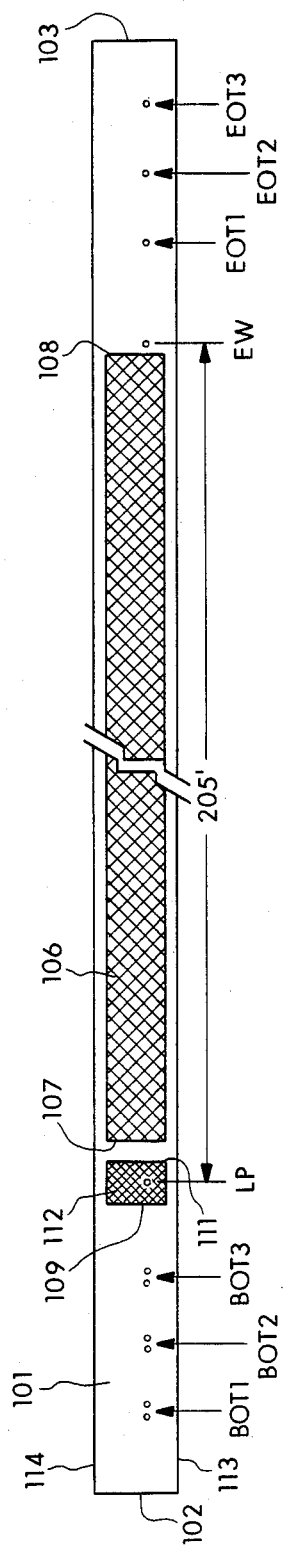
FIG. 1 discloses the general format of a tape used in accordance with the present invention.

FIG. 1 discloses a tape 101 having density ID information recorded thereon in accordance with the present invention. Tape 101 has a top edge 114, a bottom edge 113, a lead end 102 and a trailing end 103. In accordance with industry practices, three pairs of holes are perforated on the front end of the tape. These holes are designated BOT1 (beginning of tape 1), BOT2 and BOT3. These holes are used by optical detection facilities (comprising a light source, a mirror, and a light detector) on present day digital recorders and playback machines. This optical system is actuated when holes on the tape encounter the optical sensing point. At the other times, the non perforated portion of the tape block the passage of light through the tape and the optical light sensing system is deactivated. Thus, as the tape travels forward beginning with its lead end 102, the optical system first encounters the BOT1 pair of holes, it then encounters the BOT2 holes and it finally encounters the BOT3 holes. The tape travel continues until the load point (LP) hole is detected. The optical detector that senses the LP tape hole is offset approximately two inches from the beginning of the area on which density I.D. signals are written on and read from the tape. The tape density identifier region on FIG. 1 is generally designated as 112 and it has a beginning edge 109 and a trailing edge 111. The displacement of the optical sensing system from the reading and writing heads is such that the heads are over leading edge 109 of the identifier region 112 at the time the optical system senses the LP perforation. Thus, the tape density recording operation of a first track begins at edge 109 and it continues as the tape travels forward until the recording operation ends at edge 111. This records the first track of density information. The tape then reverses and moves back to the LP hole. The write head moves up and a second track is written as the tape moves forward to edge 111. The remaining density ID tracks are written one at a time in this manner. Following the writing of the last density ID track, the tape is left blank until leading edge 107 of the user data region 106 is encountered. At that time, the tape may accept the user data and format information. The recording of user data may continue for approximately 205 feet until the trailing edge 108 of the user data portion and hole EW (early warning) is encountered.

The tape of FIG. 1 is designed to accommodate the recording of a plurality of individual tracks one at a time. The travel of the tape in a forward direction from point 107 results in the recording of a first channel of user data beginning at point 107 and ending at point 108. The reversal of the tape direction occurs when the EW (early warning) hole is detected by the optical sensing system. The recording head moves up one track width and the tape then travels in the reverse direction and second channel of user data is recorded from point 108 until point 107. At this time, the recording head steps up one track width and a third track of user data is recorded as the tape moves in the forward direction. The recording continues in this manner on a track by track basis until the last track is recorded.

DESCRIPTION OF FIG. 2

Figure 2:
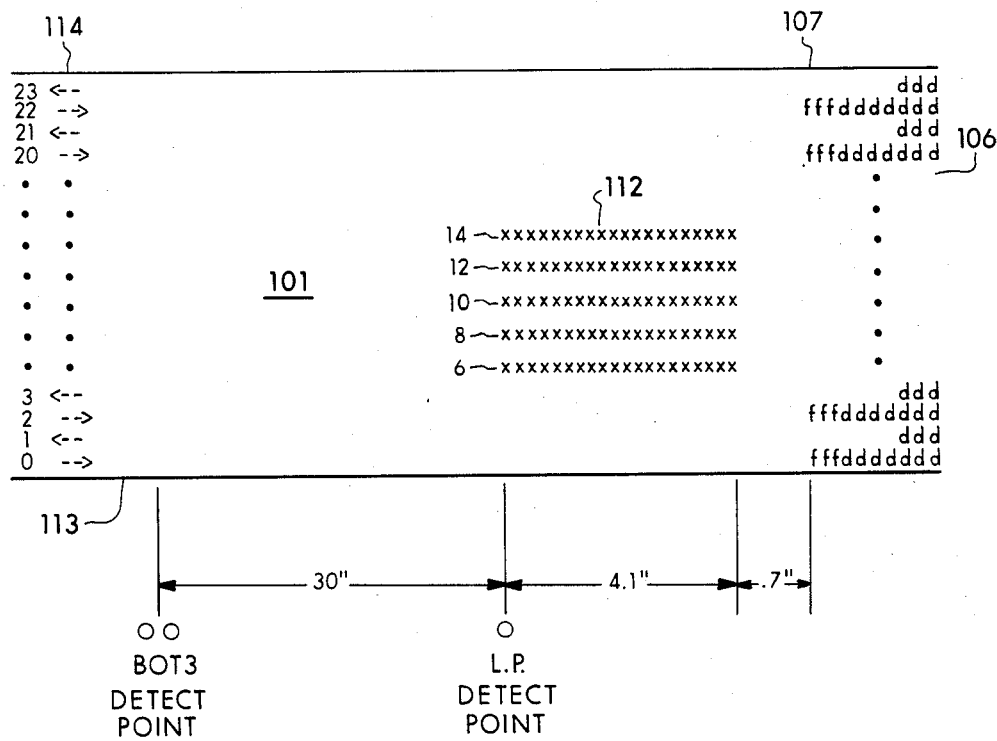
FIG. 2 discloses further details of the manner in which tape density information is recorded on parallel tracks on a tape.

FIG. 2 discloses further details of the manner in which density information is written on the tape. FIG. 2 shows tape 101 having twenty-four usable tracks designated 0 through 23. The even numbered tracks are recorded going in the forward direction (with the head moving from left to right relative to the tape on FIG. 2). The odd numbered tracks are recorded in the reverse direction.

The BOT3 detect point is shown on the left portion of FIG. 2 and thirty inches to the right of this BOT3 point is the LP hole which begins the area in which the density ID information 112 is recorded. The density ID information is recorded in the five tracks designated 6, 8, 10, 12, and 14. The density ID information 112 contained in these five tracks represents the density ID code in a binary coded manner with each track representing one bit position of the binary code and with the information recorded in each track representing the current value of the binary bit associated with the track. Thus, the use of five tracks as shown on FIG. 2 permits a five bit binary number. Obviously, this code could range from 00000 through 11111. However, 00000 is not used as a code to prevent its confusion with a blank tape.

The nature of the signal represented in each track may vary in accordance with various alternatives provided by the present invention. In the simplest embodiment of the invention, a predetermined signal having a predetermined number of flux reversals per inch, such as 1070 reversals per inch, can be recorded to indicate a binary value of 1 for the track. A track can be erased to represent a binary 0 can be recorded with an erase signal. As a second alternative, a binary 1 can be represented by recording a first number of flux reversals per inch, such as 1070 reversals, while a binary 0 can be represented by recording a signal having a different number of flux reversals per inch. This second alternative provides increased reliability for a binary 0 representation since it prevents any possibility of an unwanted erased region from representing a binary 0.

As another alternative of still further reliability, the track signals can be recorded with a predetermined binary pattern in addition to having the predetermined number of flux reversals per inch. Thus, for the alternative in which 1070 reversals per inch are used, a valid signal representing a binary 1 would have to contain not only 1070 flux reversals per inch, but would also have to contain the appropriate binary pattern. The alternative in which two different number of flux reversals per inch are used indicate either a binary 1 or a binary 0 would have not only the indicated number of reversals recorded within the track, but the reversals would also have to recorded with the appropriate binary pattern.

The density ID information is recorded on the tape of FIG. 2 beginning with the LP hole. The recording operation continues for 4.1 inches. The five tracks 6, 8, 10, 12, and 14 are recorded sequentially beginning with track 6 since the recording mechanism of one possible exemplary embodiment of the invention contains only a single recording gap. Thus, track 6 is recorded first for 4.1 inches. The tape then reverses for 4.1 inches and the recording head steps up for the width of two tracks to position itself to record track 8. The tape then advances again 4.1 inches to record track 8. The sequential recording process continues track by track in this manner until track 14 is recorded. Following the recording of track 14 for 4.1 inches, the tape is ready to be recorded in the user data portion 106 of the tape. This portion begins at point 107 and both formatting information and user data may be recorded in it.

Prior to recording any information on a tape, including the density ID information, the inter track portions of the tape are erased sequentially one at a time. The purpose of this operation is to remove any unwanted signals from these areas of the tape. The inner track erase operation begins in a forward direction with the portion of the tape one-half track below track 0 being erased in a forward direction until the EOT1 point on the tape of FIG. 1 is detected. At this time, the recording head moves up for a distance of one track width and the tape reverses direction. The tape moves in the reverse direction and the portion of the tape between track 0 and track 1 is erased. This continues until the BOT3 hole is detected. The tape stops and the record head moves upward for a distance of one track width to position itself over the inter track area between tracks 1 and 2. The tape then moves forward to erase this portion of the tape. The process continues in this manner with the tape moving back and forth and with the recording head moving upward each time to erase the inter track areas of the tape one at a time. The process ends when the portion of the tape one-half track above track 23 is erased.

The following describes the purpose and advantages of erasing the inter track areas. As a general proposition it may be stated that advances in this art are in the direction of higher linear tape densities together with narrower reading and writing head gaps. Recall that it is desirable to have commonality among different vintages of machines so that tapes written on older machines can be read and/or written on newer machines. The erasing of inter track areas in accordance with the present invention permits a new recorder with a narrow write gap to write density ID information and data on a tape that may be read by older machines having a wider read gap.

Consider the recording of a specific track of information on FIG. 2 such as, for example, density ID information on track 6. This may be written by a new state of the art machine having a relatively narrow write gap. After this tape is written, it is possible that it may be read by an older machine. The erasure of the inter track areas immediately above and below track 6 leaves a relatively wide portion of the tape free of any signal other than that specifically recorded in track 6. Thus, when this tape is read by an older machine having a wider read gap, the only signal that this head encounters is the signal recorded in track 6. It does not see any noise or spurious signals that could otherwise be contained in the portions of the tape adjacent to track 6.

All inter track areas of the tape for the entirety of its length intermediate the BOT3 point and the EOT1 point are erased in the manner above discussed. This permits an increased commonality and interchange of tapes between different vintages of machines as above discussed. It also allows greater off track error by a read head on a machine of the same vintage.

DESCRIPTION OF FIG. 3

Figure 3:
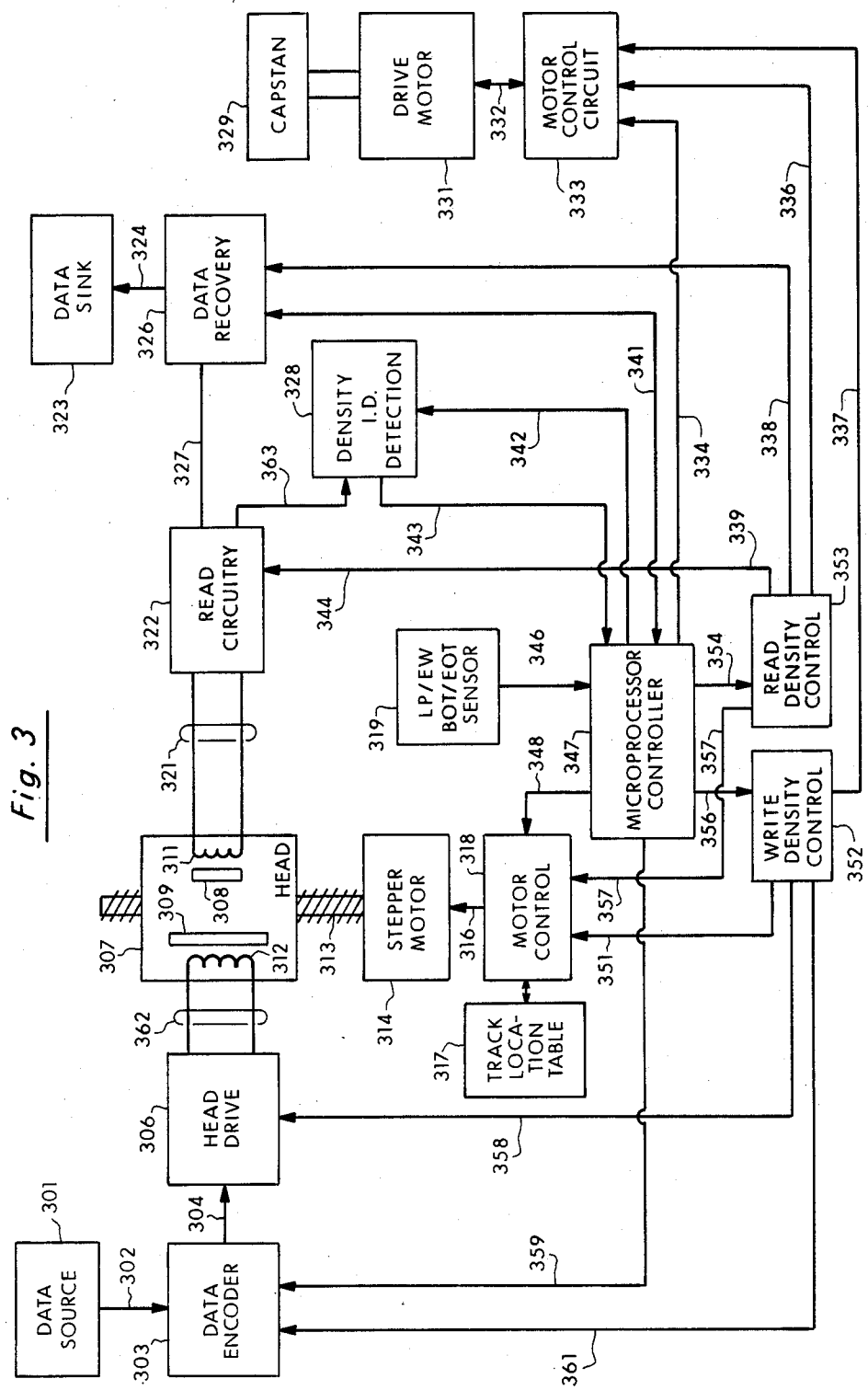
FIG. 3 discloses the details of the apparatus and circuitry used to write tape density information on and read tape density information from a tape.

FIG. 3 discloses the details of the apparatus that is used to record information on and read information from the tape. FIG. 3 shows write-read head 307 having write gap 309 and read gap 308. Associated with these gaps are write coil 312 and read or coil 311. Data to be recorded is supplied by data source 301 over path 302 to data encoder 303. Data encoder 303 converts this data to flux reversal signals. Data encoder 303 may also generate flux reversal signals directly under control of microprocessor 347 using path 359. Head drive 306 receives and amplifies the flux change signals over path 304. The resultant signals are applied over conductors 362 to write coil 312 for recording on the tape as it passes over write gap 309 of head 307.

In the read mode, the tape is passed over head 307 and read gap 308. The recorded signals are picked up by read coil 311 and applied over conductors 321 to read circuitry 322. Read circuitry 322 amplifies these signals and converts the received information into digital form and extends them over path 327 to data recovery circuit 326. This circuit decodes this digital information into data bits and applies it over path 324 to the data sink or utilization circuit 323.

Read circuit 322 also applies the digitally received information read from the tape over path 363 to density ID detection circuit 328. This circuit detects the coded information signals representing the density ID read from the tape and applies this information over path 343 to microprocessor 347. The microprocessor analyzes the received ID code to see whether the indicated tape density is in a range suitable for processing by the apparatus of FIG. 3. If the density is improper, or not within the capabilities of the apparatus of FIG. 3, then the microprocessor 347 may activate a suitable alarm. If on the other hand, the indicated ID density is within a suitable range, the microprocessor may take whatever further action is required to continue a reading of the tape as below discussed.

The microprocessor applies signals over control path 342 to control the operation of density ID detection circuit 328. The microprocessor also exchanges information over path 341 with the data recovery element 326 to control its operation.

In connection with the reception of the density ID information, microprocessor 347 applies signals over path 354 to read density control circuit 353 to cause it to perform various control functions. One of these functions is to apply signals over path 339 to control the gain and filter characteristics of read circuitry 322. Another function is to apply signals over path 338 to data recovery element 326 to control the parameters of its operation. Another function of element 353 is to apply signals over path 336 to motor control circuit 333 to control the speed and other parameters of the motor operation for read operations.

Microprocessor 347 applies signals over path 334 to motor control circuit 333 to control its operation including the starting and stopping of the motor. The motor control circuit receives signals on path 334 and 336 and applies signals over path 332 to control drive motor 331 and capstan 329. The signals required to operate the motor on a write operation are received over path 334 from microprocessor 347 and over path 337 from write density control circuit 352.

The apparatus of FIG. 3 uses a head 307 with a single read gap 308 and a single write gap 309 to read and write tapes of the type shown on FIGS. 1 and 2. The various tracks of these tapes are written and read sequentially one track at a time. This requires that the tape head be movable transversely across the width of the tape to position it as required to coact with each tape track as it is read or written. It is also required that head 307 be positioned over the inter track areas during an erase function in order to erase the inter track tape areas. The stepper motor 314 together with lead screw 313 moves head 307 from position to position transversely across the tape. Stepper motor 314 is controlled by the signals received over path 316 from motor control circuit 318.

Microprocessor 347 applies signals over path 348 to motor control element 31 to control the track to which the stepper motor 314 is to reposition head 307. Read density control element 353 applies signals over path 357 to motor control circuit 318. The function of these signals is to indicate the track density used on a tape read function. The motor control uses this track density information in conjunction with track location table 317 to determine track location.

Microprocessor 347 also applies signals over path 356 to write density control circuit 352 to adjust various functions and parameters of other elements on FIG. 3 with respect to the density to be used on a tape write operation. Element 352 receives signals on path 356 and applies signals over path 351 to indicate track density information to motor control element 318. The motor control uses this track density information in conjunction with track location table 317 to determine track location.

Sensor 319 detects the various control holes on the tape shown on FIG. 1. These perforations include the BOT and EOT holes as well as the LP and EW holes. This sensor is a part of the optical sensing system that alternatively interrupts or passes a beam of light between an optical emitter and an optical detector. The output signals of sensor 319 are applied over path 346 to microprocessor 347 to provide the microprocessor with tape position information.

The track location table element 317 provides information to motor controller 318 to permit element 318 to cause the stepper motor to controllably position head 307 over any selected track specified by microprocessor 347. In other words, on a given operation, microprocessor 347 tells motor control 318 and track location table 317 the identity of a track that is to be read or written. In response to the receipt of this information, track location table 317 supplies motor control element 318 the signals required so that motor control element 318 can cause stepper motor 314 to move the head 307 to the track position specified by the microprocessor 347.

Write density control element 352 supplies head drive parameter signals to head drive circuit 306 over path 358. These signals include various parameters including write current, write current rise time, and write current overshoot. Write density control element 352 also passes signals over path 361 to control the operation of data encoder 303. Included among these signals are various encoding parameters including the encoding scheme to be used as well as the embedded basic clock rate.

Microprocessor 347 applies signals over path 359 to control data encoder 303. Included among these signals is an erase control signal that is used on all erase operations including the inter track erase function. In other words, it is the signals provided over path 359 that controls the recording of the appropriate tape density signals in each track of the density ID section 112 on FIG. 2. As already mentioned, during the recording of this density ID information, various alternatives of differing reliability may be used.

DESCRIPTION OF FIG. 4

Figure 4:
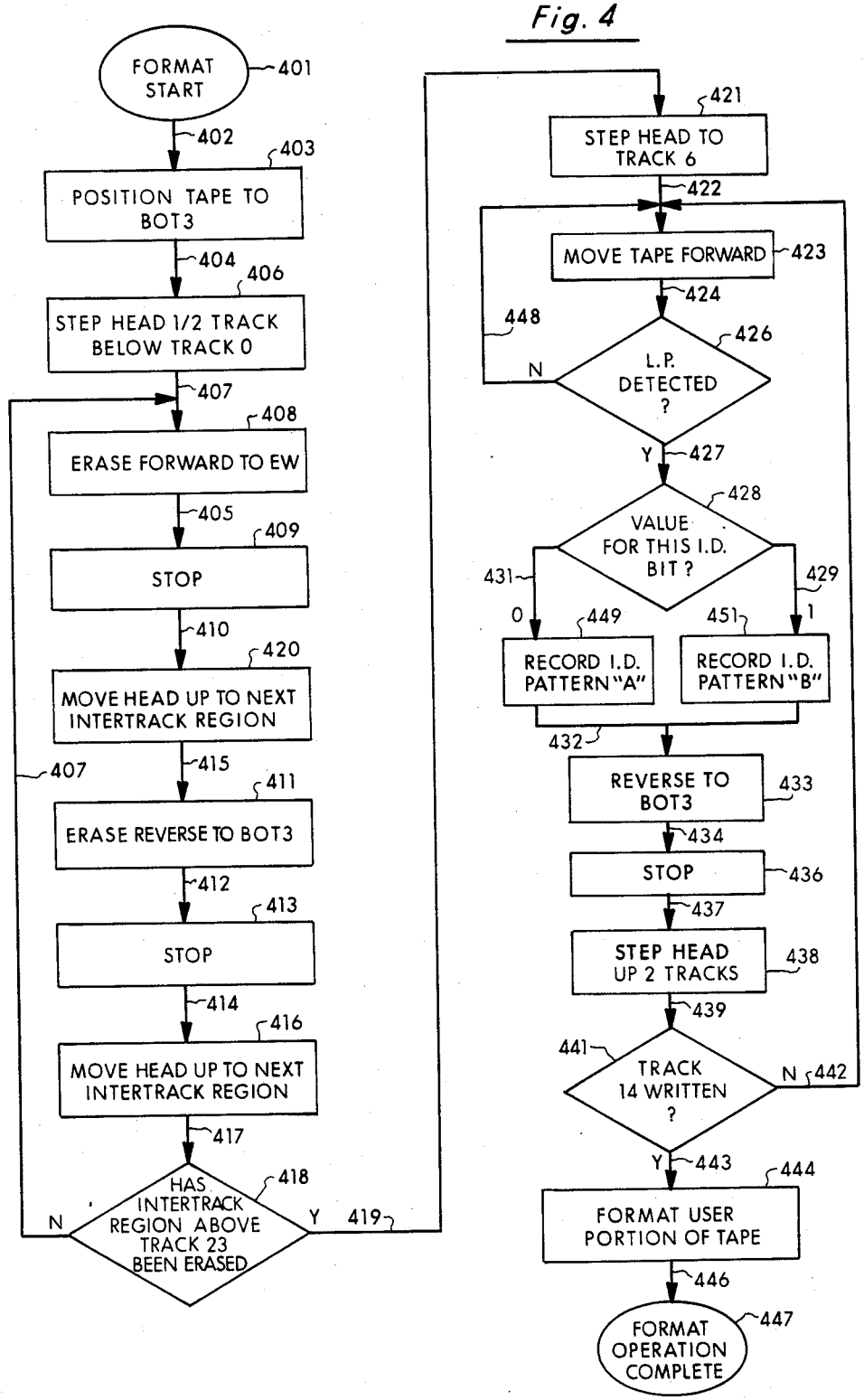
FIGS. 4 and 5 illustrate further details of the process used to implement one embodiment of the invention.

FIG. 4 discloses the details of the process used in formatting the tape of FIG. 2 and in writing density information thereon. Formatting the tape prepares it to receive the density ID signals and user data. The process begins on the top of FIG. 4 with element 401 which is termed "format start." The process extends over path 402 to element 403 which positions the tape to the BOT3 position as shown on FIG. 1. The process extends over path 404 to element 406 which steps recording head 307 transversely so that it is positioned one-half track immediately below the track 0 longitudinal area. On FIG. 2 it is seen that track 0 represents the bottom most track on which the information is recorded. Therefore, the positioning of record head 307 one-half track position below track 0 prepares the apparatus of FIG. 3 to erase the longitudinal portion of the tape immediately below track 0.

The process extends over path 407 to element 408. Element 408 causes the apparatus of FIG. 3 to move the tape forward and perform an erase operation until the EW hole is detected. After the tape has traveled forward to the EW hole, the process stops with element 409. The process extends over path 410 to element 420. This element causes the tape mechanism head to move up to the next inter track region. This is the region midway between tracks 0 and 1. Element 411 moves the tape backwards and erases this inter track region until it reaches the BOT3 hole. The process then extends over path 412 to element 413 which stops the tape. The process extends over path 414 to element 416 which causes tape head 307 to move up one track position to the next inter track region. At this time, the tape is immediately above track 1 of FIG. 2 and is prepared to erase this inter track portion of the tape.

The process continues over path 417 to decision making element 418 which determines whether or not the inter track region above track 23 on the tape has been erased. The answer to this question is no during this first pass through the loop and, therefore, the process extends over the no output and path 407 and back to the input of element 408. The process continues and the portion of the tape above track 1 is erased.

The process continues in this manner through the loop with the "no" output of element 418 being active until the region immediately above track 23, has been erased. When this happens, element 418 produces an output on its "yes" output extending over path 419 to the input of element 421.

Element 421 causes the tape head 307 to move transversely so that it is positioned over track 6 on FIG. 2. The process extends over path 422 to element 423 which causes the tape to move forward from its BOT3 position. The process continues over path 424 to element 426. Element 426 is a decision making element and causes the tape to move until the LP hole is detected. When the LP hole is detected, the process continues out over the "yes" output of element 426 on path 427 to element 428. Element 428 is supplied by microprocessor 347 with information indicating whether the information in this track, i.e., track 6 on FIG. 2, is to be recorded to represent a binary 0 or a binary 1. If the track is to represent a binary 0, the process continues over path 431 to element 449. On the other hand, if the track is to represent a binary 1, the process continues over path 429 to element 451. Either element 449 or element 451, depending upon the binary value to be represented by the track, causes the appropriate pattern of information to be recorded in track 6 at this time. Elements 449 or 451 cause the ID pattern to be recorded for a distance of 4.1 inches from the LP hole as shown on FIG. 2. Having finished this recording operation, the process continues out over path 432 to element 433.

Element 433 indicates that the end of the 4.1 recording interval has been reached and reverses the direction of the tape to move it back to BOT3. The process continues over path 434 to element 436 which stops the tape in its BOT3 position. The process continues over path 437 to element 438 which causes tape head 307 to be moved upwards transversely for a distance of two track widths. At this time, the tape head is moved from track 6 to track 8.

The process continues over path 439 to element 441 which determines whether or not track 14 has just been written. Since at this time only track 6 has been written, the process continues out over path 442 and loops back to the input of element 423. From there, the process is repeated for track 8 and all subsequent tracks in the same manner as described in detail for the recording of ID information in track 6. Finally, when track 14 has been recorded and the decision making element 441 is reached, the process continues out on the yes output of element 441 over path 443 to element 444. This element causes the user portion of the tape as shown on FIGS. 1 and 2 to be formatted in the appropriate manner. The manner in which this tape is formatted is no part of the present invention and is not described in further detail. Next, the process continues over path 446 to 447 which determines that the process of formatting the tape has been completed.

Elements 449 and 451 respectively, record either pattern A or pattern B respectively, on the tape depending upon whether the recorded information is to represent a binary 0 or a binary 1. As above mentioned, various alternatives may be used, depending upon the degree of reliability required, to record information on a given track signifying whether the track represents a binary 0 or a binary 1. One such possible method is to erase a track to represent a binary 0 and to record a signal of 1070 flux changes per inch if the track is to represent a binary 1. Another alternative possibility is to record a signal of 1070 flux changes per inch to represent a binary 1 and to record another signal containing an appropriate number of flux changes per inch for a binary 0 instead of using an erased region as with the first mentioned alternative. Both this method and the preceding one have the advantage of simplicity since individual bits do not need to be decoded.

On the other hand, if still higher reliability is desired, the two signals recorded in accordance with this last mentioned alternative may be superimposed with a predetermined binary pattern to provide higher reliability and to prevent the recorded information from possibly being confused with user data. In summary, elements 449 and 451 may be programmed by microprocessor 347 to record information in accordance with any of the above mentioned alternatives.

DESCRIPTION OF FIG. 5

Figure 5:
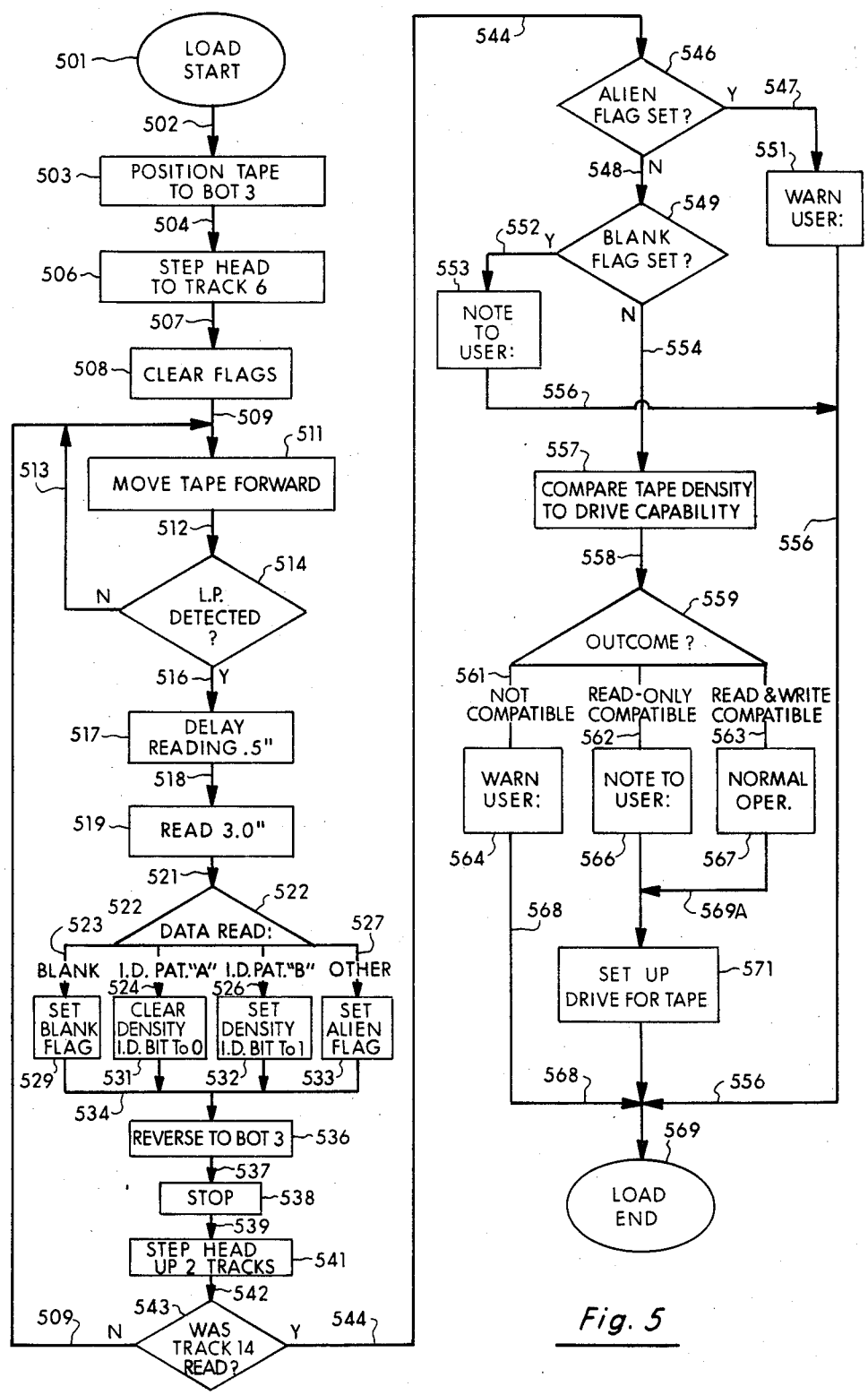

FIG. 5 describes the operation of the system of FIG. 3 in connection with a tape read operation which reads the density information 112 priorly recorded in the five tracks of FIG. 2. The process starts with element 501 and extends over path 502 to element 503 which positions the tape so that it is over the BOT3 hole. The process extends over path 504 to element 506 which moves the reading head transversely so that it is over track 6 in preparation for reading the density information on track 6. The process extends over path 507 to element 508 which clears control flags in microprocessor 347. These two flags are termed alien flag and blank flag. The process continues over path 509 to element 511 which causes the tape to begin moving forward. The process continues over path 512 to element 514 which determines whether or not the tape has advanced to the LP hole. If it has not advanced to this hole, the process loops back over path 513 to the input of element 511 and the tape continues moving until the load hole is detected.

When the tape advances to the LP hole, the process proceeds out on the "yes" output of element 514, over path 516 to element 517 which causes a delay of one-half inch in the reading process. The reason for this one-half inch delay is to avoid any possibility of the read head reading any noise that may be recorded immediately ahead of or even slightly into the lead portion of the ID portion of the track. Following this one-half inch delay, the process continues over path 518 to element 519 which reads the ID information on track 6 for a tape length of three inches. Following this three inch read operation, the process continues over path 521 to element 522 which, under control of microprocessor 347, selects one of its outputs in accordance with the nature of the information detected during the three inch read operation.

Output 523 of element 522 is selected if no information was read and element 529 causes the blank flag element to be set within microprocessor 347. Output 524 of element 522 is activated if ID pattern A, which represents a binary 0, was read. In this case, element 531 clears or resets the corresponding density ID bit within microprocessor 347 to a 0 state indicating that the track is to represent a binary 0. Output 526 is activated if ID pattern B, representing a binary 1, is read. This causes element 532 to set the corresponding density ID bit within microprocessor 347 to a 1 state to indicate that the information recorded in the track represents a binary 1.

Other conditions may be encountered by element 522 such as, for example, user data rather than valid ID information may be detected during the three inch read operation of element 519. In this case, the tape is termed an alien tape since it does not contain valid density ID information and therefore the alien flag is set within microprocessor 347.

Next, the process continues from the output of any one of elements 529, 531, 532, or 533 and over path 534 to element 536 which reverses the tape drive and returns the tape to its BOT3 position. The process continues over path 537 to element 538 which stops the movement of the tape. The process continues over path 539 to element 541 which causes tape head 307 to move up transversely for a distance of two track widths. This positions the tape head over track 8 at this time. The process continues over path 542 to decision making element 543 which has "yes" and "no" outputs. Element 543 determines whether or not track 14 has yet been read. At this time, track 14 has not been read and therefore the "no" output of element 543 is activated. The process continues over path 509 and loops back to the input of element 511 which begins another iteration of the process already described. The second track, namely track 8, is read at this time in the same manner as above described for track 6 and element 543 is once again encountered. The "no" output of this element is again activated and the process continues for the reading of track 10 and subsequent tracks in the same manner.

Finally, track 14 is read and element 543 is again encountered. This time, since track 14 has been read, the "yes" output of element 543 is activated and the process extends over path 544 to the input of decision making element 546. If the alien flag bit is set, the process continues over the "yes" output of element 546 and over path 547 to element 551 which warns the user that the tape now being read may contain data but is incompatible with this system. The user is further instructed that the tape may be written on by reformatting in this system but that any previous data will be lost. The process continues over path 556 to end point 569.

If the alien flag is not set, the "no" output of element 546 is activated and the process continues over path 548 to element 549 which determines whether or not the blank flag has been set. If the blank flag is set, the process continues over the "yes" output of this element and over path 552 to element 553 which informs the user that the tape now being read appears to be blank and must be formatted before use. The process then continues over path 556 to the end point of the process at element 569. However, in an embodiment where the "blank" or erased condition is used to indicate one binary condition, the blank flag is not used.

If the blank flag is not set, the "no" output of element 549 is encountered and the process continues over path 554 to element 557 which compares the tape density ID read from the five tracks with the capability of the apparatus of FIG. 3. In other words, it is possible that a tape may have valid density ID information in its five tracks, but that this information may represent a tape density that is not compatible with the apparatus of FIG. 3. The process continues over path 558 and element 559 compares the density ID information read from the tape with the capability of the reading apparatus of FIG. 3. Element 559 is controlled in its operation by microprocessor 347. If element 559 determines that the apparatus of FIG. 3 is not compatible or cannot read data with the density indicated by the density ID code read from the tape, output 561 is selected and element 564 warns the user that this tape cannot be read by this drive apparatus. The process then continues over path 568 to end point 569.

Another possibility that may be encountered by element 559 is that the apparatus of FIG. 3 can read user data of the indicated density but does not have the capability of writing at this density. In this case, output 562 is activated and element 566 informs the user that the tape can be read but not written by this drive.

Another possibility that may be encountered is that the indicated tape density information represents a density for the user data that can be both read and written by the apparatus of FIG. 3. In this case, the process continues over path 563 to element 567 which permits normal operation to continue.

Output 569A is activated in the event that either element 566 is activated for a read only compatible situation, or element 567 is activated for a read and write compatible situation. In either event, the process continues over path 569A to element 571. Element 571 operating under control of microprocessor 347 adjusts the circuitry and apparatus of FIG. 3 so that the read only function of element 566 or the read and write function of element 567 may now be performed. The functions controlled by element 571 include adjusting the read amplifier gain, adjusting the read amplifier filter characteristics, adjusting the data recovery parameters, controlling the tape speed and other parameters, adjusting the data encoder parameters, adjusting the head drive parameters, addressing the proper locations of the track location table element 317, and adjusting all of the other mechanical and electrical characteristics of the apparatus of FIG. 3 so that the required tape operations can now be performed.

The process continues over path 568 to the end point 569. The user data portion of the tape is now ready to be read and the load end point 569 permits the process to continue unless terminated by the user. It is the user's option to terminate the operation if a blank tape indication of element 553, an incompatible tape warning of 551 or a format warning of elements 564 and 566 is received. The manner in which the user data portion of the tape is read and processed is not a part of this invention and is described in no further detail.

DESCRIPTION OF FIG. 6

Figure 6:
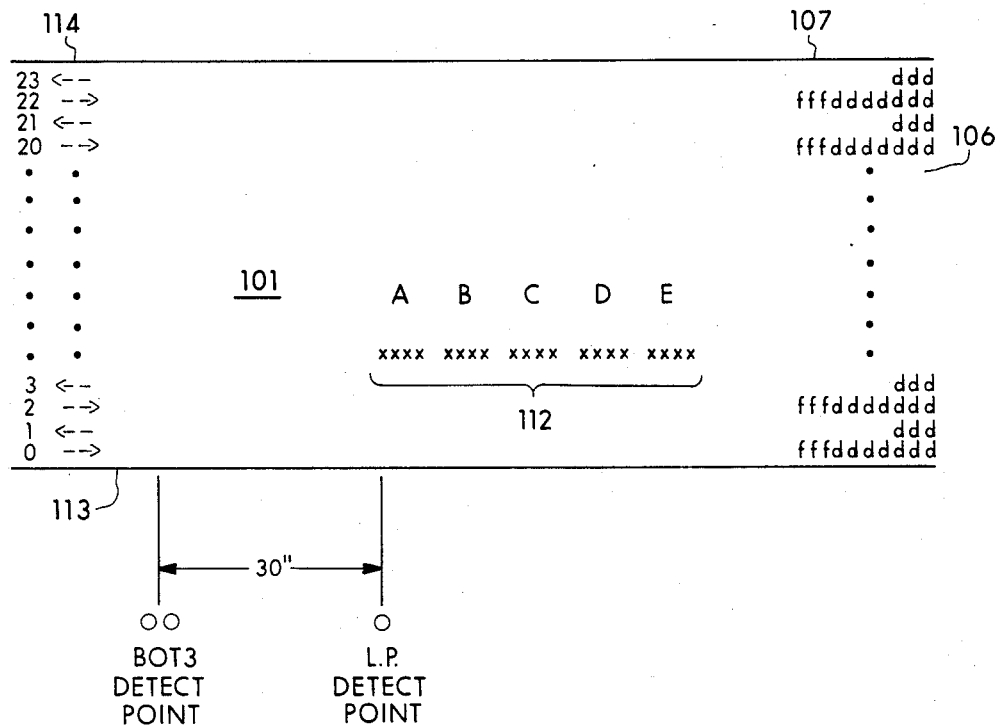
FIG. 6 discloses an alternative embodiment to FIG. 2 in which density information is recorded on a plurality of different areas of a tape.

FIG. 6 is similar to FIG. 2 except that it discloses an alternative embodiment in which the density information is recorded in a plurality of discrete segments of a single track of the tape rather than being recorded in a plurality of separate tracks. Specifically, FIG. 6 discloses a tape similar in every respect to that of FIG. 2 except that the density information is recorded in a plurality of discrete segments of track 6. These discrete segments are designated A, B, C, D, and E.

In recording the density information, the LP detect point is encountered as the tape advances. Then, the five bits of the density ID code (for a five bit code) are sequentially recorded in segments A, B, C, D, and E in that order. The bit for segment A is first recorded for approximately one inch. Following that, the bit for segment B is recorded for one inch and so on in a similar manner for the bits of segments C, D, and E. The information recorded in all of segments A, B, C, D, and E together represent the density information in a coded manner in exactly the same manner as described for the arrangement of FIG. 2 in which the information is recorded in five different tracks rather than in five discrete segments of the same track.

DESCRIPTION OF FIG. 7

Figure 7:
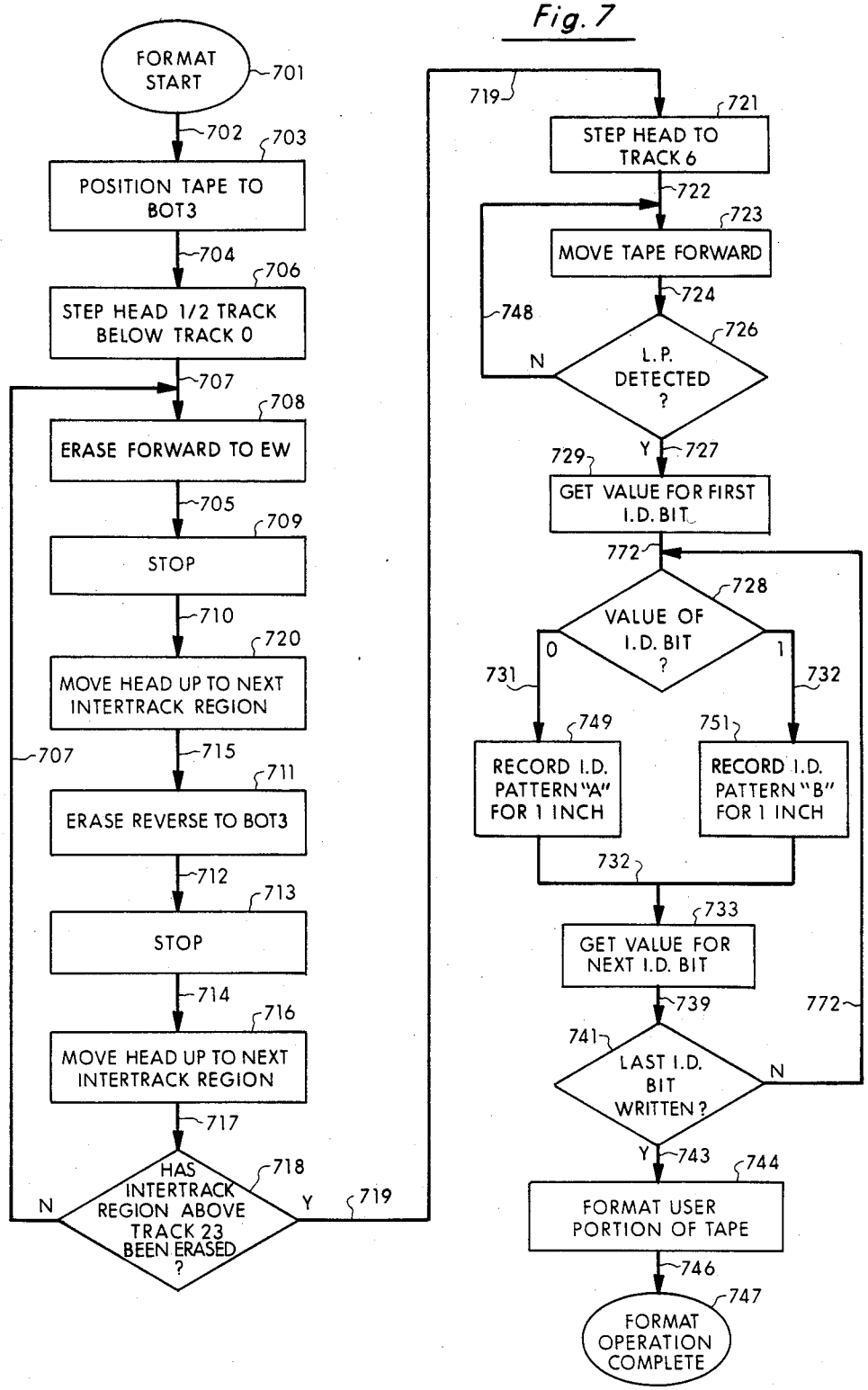
FIGS. 7 and 8 illustrate details of the process used to implement the embodiment of FIG. 6.

FIG. 7 discloses the details of the process used first to erase the inter track areas and then to record density ID information on the tape of FIG. 6. The left column of FIG. 7, beginning with the top element 701 and extending down to the bottom element 718 is identical to the corresponding elements 401 through 418 of FIG. 4 and therefore need not be described again in detail. Elements 701 through 718 cause the inter track areas of the tape between the BOT3 hole and the EW hole to be erased sequentially one at a time.

Once the inter track erase operation has been completed, the process extends over path 719 to element 721 which causes the tape head to be moved to track 6. The process extends over path 722 to element 723 which moves the tape forward. The process extends over path 724 to element 726 which determines whether or not the LP hole has been detected. If the answer is "no", the process loops back over path 748 and the tape continues to move forward until element 726 determines that the LP hole has been detected. At this time, the process extends out over the "yes" output of element 726 to element 729 which obtains the value of the first ID bit to be recorded from microprocessor 347.

The process continues over path 772 to element 728 which indicates whether the value of the ID bit to be recorded is a binary 0 or a binary 1. If the value is a 0, the process extends over path 731 to element 749 which causes a 0 to be recorded in the appropriate pattern "A" for a tape length of one inch. If a 1 is to be recorded, the process extends over path 732 to element 751 which causes a binary 1 to be recorded by recording pattern "B" for a length of one inch. Patterns A and B represent various alternative recording techniques which have been priorly discussed in connection with FIG. 4 and therefore are not repeated herein in detail.

After the appropriate pattern A or B is recorded to represent a 0 or a 1, the process extends over path 732 to element 733 which causes the value of the next ID bit to be obtained. The process then extends over path 739 to element 741 which determines whether or not this is the last ID bit pattern to be written. Since at this time only the first of the five ID bits has been recorded, the process extends out over the no output of element 741 and over path 772 back to the input of element 728. The process is then repeated for the second bit as well as subsequent bits until such time as element 741 determines that the last bit has been written. At this time, the process extends out over the "yes" output of element 741 and over path 743 to element 744 which causes the user portion of the tape to be formatted. The process then extends over path 746 to element 747 which indicates that the format operation and the process of writing the tape density information has been completed.

DESCRIPTION OF FIG. 8

Figure 8:
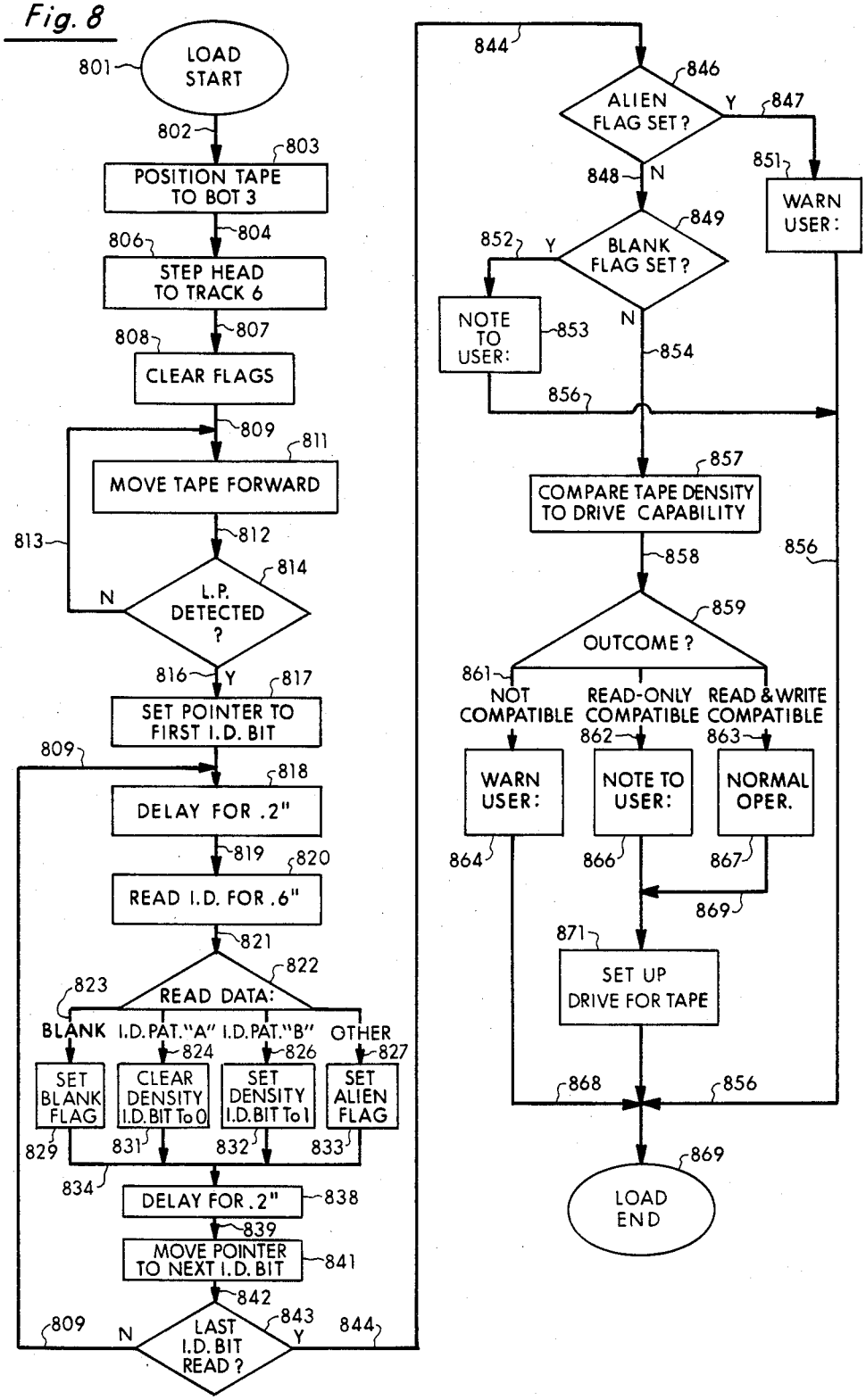

FIG. 8 discloses the details of the process used in accordance with the present invention to read density information written on the tape of FIG. 6 by the process of FIG. 7. The process begins in element 801 designated load start. The process continues over path 802 to element 803 which positions the tape to the BOT3 hole. The process then advances over path 804 to element 806 which steps the tape head to track 6. The process extends over path 807 to element 808 which clears the appropriate flags in microprocessor 347. The process then continues over path 809 to element 811 which causes the tape to begin moving forward. Element 814 monitors the motion of the tape and, by virtue of its no output and path 813, keeps the tape moving forward until the LP hole is detected. When the LP hole is detected, the process advances out over the yes output and over path 816 to element 817 which causes the microprocessor to prepare itself for reading the first density ID bit. This is the bit in tape segment A on FIG. 6. The reading of the tape is delayed for approximately 2/10 of an inch by element 818 to prevent the possibility of noise or extraneous information from being read. The process then continues over path 819 to element 820 which reads tape segment A on FIG. 6 for 6/10 of an inch to obtain the value of the ID bit recorded in tape segment A.

The process then extends over path 821 to element 822 which selects one of its outputs in accordance with the results obtained from the read operation of element 820. If a blank tape has been read, the process extends over path 823 to element 829 which causes a blank tape flag to be set in the microprocessor. If an alien tape has been read, the process extends over path 827 to element 833 which causes an alien flag bit to be set. An alien tape is one that contains user data or other information in the density ID portion of the tape. If pattern A has been read representing a binary 0, the path extends over path 824 to element 831 which resets the density ID bit to a 0. If a pattern B was read representing a binary 1, the process extends over path 826 to element 832 which sets the density ID bit in the microprocessor to a 1.

With the appropriate bit set in the microprocessor, the process extends over path 834 to element 838 which inhibits reading of the tape for 2/10 of an inch to prevent the possibility of any unwanted signals from being read that might be contained in this part of the tape. The process then extends over path 839 to element 841 which prepares the microprocessor to read and receive the density information recorded in segment B of the tape shown on FIG. 6. The process then continues over path 842 to element 843 which determines whether or not the last ID bit has been read. Since, at this time, only the first bit in segment A has been read, the process extends out over the no output and path 809 and loops back to the input of element 818.

The above described process is repeated and the density information in tape segment B of FIG. 6 is read. The density information in the remaining segments namely C, D, and E is read in the same manner. Finally, when the information in segment E is read, the yes output of element 843 is selected and the process extends over path 844 to element 846.

Elements 846 through 869 are directly comparable in every respect to the corresponding elements 546 through 569 which have been described in detail in connection with FIG. 5. Therefore, the function of elements 846 through 869 need not be repeated in detail herein. Briefly, they relate to the process used to control the operation of the apparatus of FIG. 3 under control of the tape density information read by element 822, 829, 831, 832, and 833.

While preferred embodiments of the present invention have been shown, it is to be expressly understood that modifications and changes may be made thereto and that the scope of the present invention is set forth in the following claims. For example, the invention has been described in connection with the use of magnetic tapes. Obviously, the invention is equally well suited for use with any magnetic medium and, in particular, is well suited for use with magnetic disks.

I claim:

1. Apparatus adapted to record density information magnetically in a plurality of discrete areas in a first location on a record member with said information representing the areal density of data recorded magnetically on a plurality of tracks in a second location on said member, said apparatus comprising:
   means effective prior to the recording of said density information for erasing all portions of said member immediately adjacent each of said plurality of tracks, and means for subsequently recording said density information in said plurality of discrete areas in binary coded form with said information recorded in each discrete area representing the value of one bit of said code and with the information in all of said discrete areas combined representing the coded value of said density information, said density information in each area being recorded at a flux reversal density that is unique to the coded bit value represented by said each area.

2. Apparatus adapted to record information magnetically in a plurality of discrete areas in a first location on a record member with said information specifying the areal density of user data recorded on a plurality of tracks in a second location on said member, said apparatus comprising:
 a write head,
 means including said write head and effective prior to the recording of said information or said data for erasing all portions of said member immediately adjacent said plurality of tracks, and
 means including said write head for subsequently recording said information in said plurality of discrete areas in binary coded form with said information recorded in each discrete area representing the value of one bit of said code and with the information recorded in all of said discrete areas combined representing the coded value of said information specifying said density,
 said information in each area being recorded at a flux reversal density that is unique to the coded bit value represented by said each area.

3. The apparatus of claim 2 in combination with apparatus for subsequently recording said user data on said tape at said specified density.

4. The apparatus of claim 3 in combination with apparatus for subsequently reading said member having said information specifying said density and said user data recorded thereon, said reading apparatus comprising:
 means for reading said information from said member, and
 means responsive to said reading of said information for adjusting parameters of said last name apparatus for the reading of user data from said member.

5. The apparatus of claim 3 in combination with apparatus for subsequently reading said member having said information specifying said density and said user data recorded thereon, said reading apparatus comprising:
 means for reading said information from said member, and
 means responsive to said reading of said information for adjusting parameters of said recording apparatus for the recording of user data on said member at a density specified by said recorded information specifying said density.

6. The apparatus of claim 3 wherein said member has leading edge and trailing edge control indicia and a location intermediate said leading edge and trailing edge control indicia for the recording of said data and said specifying said density, said apparatus further comprising,
 means for detecting a last one of said leading edge indicia, and
 means responsive to said detection for recording said information in said discrete areas on said member intermediate said last indicia and said location on said member in which said user data is to be recorded.

7. Magnetic recording apparatus adapted to write areal density information in a first location on a magnetic tape having a plurality of parallel tracks longitudinally positioned parallel to edges of said tape, said density information specifying the signal density of user data written in a second location on said tape, said apparatus comprising:
 a write head,
 means including said write head and effective prior to a writing of information on said tape for erasing all areas on said tape immediately adjacent each of said tracks sequentially, one track at a time, and
 means including said write head for writing said signal density information in coded form on a plurality of said tracks sequentially, one track at a time, in said first location with said density information being indicated by the combined information written on said last named plurality of tracks,
 said density information in each track being written at a flux reversal density that is unique to the coded value represented by said each track.

8. The apparatus of claim 7 in combination with means for subsequently writing user data in said second location on said tape at a density specified by said density information written in said first location on said tape, and
 means for subsequently reading said density information to control the reading of said user data from said tape.

9. Magnetic recording and reading apparatus adapted to write and read areal density information in a first location on a magnetic tape having a plurality of parallel tracks longitudinally positioned parallel to edges of said tape, said information specifying the signal density of user data written in a second location on said tape, said apparatus comprising:
 a write head, and
 means including said write head for writing said density information in coded form on a plurality of said tracks sequentially, one track at a time, in said first location with said density information being indicated by the combined information written on said last named plurality of tracks, and
 said density information in each track being written at a flux reversal density that is unique to the coded value represented by said each track.

10. The apparatus of claim 9 in combination with means including said write head effective prior to said writing of said density information for erasing all areas on said tape immediately adjacent each of said tracks.

11. The apparatus of claim 10 in combination with means responsive to the writing of said density information in said first location on said tape for writing said user data on said tape at said specified density in said second location with said data being written in a plurality of tracks sequentially one track at a time.

12. The apparatus of claim 9 in combination with means for subsequently reading said density information on said tape, and
 means responsive to said reading of said density information for adjusting parameters of said reading apparatus for controlling the reading of said data from said tape.

13. The apparatus of claim 12 wherein said tape has a control indicia on its leading and trailing edges and a location for recording user data intermediate said leading and trailing edges, said apparatus further comprising:

means for detecting a last one of said leading edge indicia, and means for writing said density information in responsive to said detection in said first location on said tape intermediate said last named indicia and said second tape location in which said data is recorded.

14. The apparatus of claim 9 wherein said means for writing includes means for writing said density information in a track with a signal having a first flux reversal density when said track represents a first binary state and for erasing said track when said track represents a second binary state.

15. The apparatus of claim 9 wherein said means for writing includes means for writing said density information in a track with a signal having a first flux reversal density when said track represents a first binary state and with a signal having a different flux reversal density when said track represents a second binary state.

16. A method of operating magnetic recording apparatus adapted to record density information in a plurality of discrete areas in a first location on a record member with said information specifying the signal density of user data recorded on a plurality of tracks in a second location on said member, said method comprising the steps of:

erasing all portions of said member immediately adjacent each of said plurality of tracks prior to a recording of said density information, and recording said density information in binary coded form in said plurality of said discrete areas in said first location with the information recorded in each discrete area representing one bit of said code and with said density information being represented by the combined information recorded in said plurality of discrete areas, said density information in each area being recorded at a flux reversal density that is unique to the bit value represented by said each area.

17. The method of claim 16 in combination with a method of operating apparatus adopted to read said density information and said user data, said method comprising the steps of:

recording said user data in said second location on said member at a density specified by said density information recorded in said first location on said member, subsequently reading said density information from said member, adjusting parameters of said last named apparatus in response to said reading, and reading said user data from said member under control of said adjusted parameters controlled by said density information read from said member.

18. The method of claim 16 wherein there is control indicia on a leading portion of said member, said method further including the steps of:

detecting said control indicia as said member is to be recorded with said density information and, recording said density information on said member upon said detection in said first location of said member intermediate said control indicia and said second location of said member in which said data is recorded.

19. A method of operating magnetic recording apparatus for writing density information in a first location on a magnetic tape specifying the signal density of user data written in a second location on said tape, said method comprising the steps of:

defining a plurality of longitudinal parallel tracks on said tape, and operating a write head to write said density information in coded form on said plurality of said tracks sequentially, one track at a time, in said first location wherein said density information is represented by the combined information written in said plurality of tracks, said density information in each track being written at a flux reversal density that is unique to the coded value represented by said each track.

20. The method of claim 19 in combination with the step of erasing all areas on said tape immediately adjacent each of said tracks prior to said writing of said density information.

21. The method of claim 19 in combination with the step of writing said user data in said second location with said data being written at said specified density in a plurality of tracks sequentially one track at a time.

22. The method of claim 21 in combination with a method of operating apparatus adopted to read said density information and said data on said tape, said method comprising the steps of:

subsequently reading said density information from said tape, adjusting parameters of said apparatus in response to said reading, and reading said user data from said tape under control of parameters controlled by said reading of said density information.

23. The method of claim 21 in combination with a method of operating apparatus adopted to read said density information and said user data on said tape, said method comprising the steps of:

subsequently reading said density information from said tape, adjusting parameters of said apparatus in response to said reading, and writing said user data on said tape under control of parameters controlled by said reading of said density information.

24. The method of claim 22 wherein there is control indicia on a leading edge of said tape, said method further including the steps of:

detecting said control indicia as said tape is to be written with said density information, and writing said density information on said tape upon said detection in said first location of said tape intermediate said control indicia and the said second location of said tape on which said data is to be written.

25. The method of claim 20 wherein said density information written in a track is written with a signal having a first flux reversal density when said track represents a first binary state and is written by erasing said track when said track represents a second binary state.

26. The method of claim 20 wherein said density information written in a track is written with a signal having a first flux reversal density when said track represents a first binary state and is written with a signal of a different flux reversal density when said track represents a second binary state.

27. Apparatus for writing information on a plurality of parallel tracks of a magnetic medium adapted to be read subsequently by other apparatus including a reading head having a relatively wide gap, said apparatus for writing comprising:
- a writing head having a relatively narrow gap,
- means for controlling said writing head to erase all areas on said medium immediately adjacent each of said tracks on said medium prior to a writing of information on said medium, and
- means for subsequently controlling said writing head to write information in said tracks on said medium.

28. The apparatus of claim 27 wherein said last named means further comprises:
- means for writing density information in coded form in a plurality of areas in a first location of said medium with said density information specifying the density at which user data is written on said tracks in a second location on said medium,
- said density information in each area being written at a flux reversal density that is unique to the coded value represented by said each area, and
- means for subsequently writing said user data on said tracks in a second location of said medium at said specified density.

29. A method operating apparatus including a writing head having a relatively narrow gap for writing information on a plurality of parallel tracks of a magnetic medium adapted to be read subsequently by other apparatus including a reading head having a relatively wide reading head gap,
- controlling said writing head to erase all areas on said medium immediately adjacent each of said tracks on said medium, and
- subsequently controlling said writing head to record information in said tracks on said medium.

30. The method of claim 29 wherein said last named step comprises the additional steps of:
- writing density information in coded form in a plurality of areas in a first location of said medium with said density information specifying the density at which user data is written in said tracks in a second location on said medium,
- said density information in each area being written at a flux reversal density that is unique to the coded value represented by said each area, and
- subsequently writing said user data on said tracks in said second location at said specified density.

31. Magnetic recording apparatus adapted to write areal density information in a first location on a magnetic tape having a plurality of parallel tracks longitudinally positioned parallel to edges of said tape, said information representing the signal density of user data written in a second location on said tape, said apparatus comprising:
- a write head,
- means including said write head and effective prior to said writing of said user data or said density information for erasing all areas on said tape immediately adjacent each of said tracks,
- means including said write head for subsequently writing said signal density information in coded form sequentially, one track at a time, in said first location with said density information being indicated by the combined information written on said last named plurality of tracks,
- said density information written on each track representing the value of one bit of said code and with the information in all of said tracks combined representing the coded value of said density information,
- said means for writing said density information in a track including means for writing said information with a signal having a first flux reversal density when said track represents a first binary coded value and with a signal having a different flux reversal density when said track represents a second binary coded value,
- means effective subsequent to the writing of said density information in said first location on said tape for writing said user data on said tape in said second location with said data being written in a plurality of said tracks sequentially one track at a time,
- said tape having control indicia on its leading and trailing edges and a location for recording said user data intermediate said leading and trailing edges, said apparatus further comprising:
- means for detecting a last one of said leading edge indicia, and
- means for writing said density information in response to said detection in a location on said tape intermediate said last named indicia and said second tape location in which said data is recorded.

* * * * *